US010086395B2

(12) United States Patent
Goettke

(10) Patent No.: US 10,086,395 B2
(45) Date of Patent: Oct. 2, 2018

(54) DISPENSER

(71) Applicant: RPC Bramlage GmbH, Lohne (DE)

(72) Inventor: Sabine Goettke, Lohne (DE)

(73) Assignee: RPC Bramlage GmbH, Lohne (DE)

( * ) Notice: Subject to any disclaimer, the term of this patent is extended or adjusted under 35 U.S.C. 154(b) by 138 days.

(21) Appl. No.: 15/103,087

(22) PCT Filed: Dec. 10, 2014

(86) PCT No.: PCT/EP2014/077181
§ 371 (c)(1),
(2) Date: Jul. 22, 2016

(87) PCT Pub. No.: WO2015/086664
PCT Pub. Date: Jun. 18, 2015

(65) Prior Publication Data

US 2016/0325297 A1 Nov. 10, 2016

(30) Foreign Application Priority Data

Dec. 10, 2013 (DE) ........................ 10 2013 113 791

(51) Int. Cl.
*G01F 11/00* (2006.01)
*B05B 11/00* (2006.01)

(52) U.S. Cl.
CPC ...... *B05B 11/3094* (2013.01); *B05B 11/3001* (2013.01); *B05B 11/3053* (2013.01); *B05B 11/3069* (2013.01); *B05B 11/3074* (2013.01)

(58) Field of Classification Search
CPC ............. B05B 11/0067; B05B 11/3001; B05B 11/3023–11/3026; B05B 11/3053; B05B 11/3069; B05B 11/3074; B05B 11/3094
See application file for complete search history.

(56) References Cited

U.S. PATENT DOCUMENTS 3,268,123 A * 8/1966 Spatz .................. B65D 47/243 137/508
3,774,849 A * 11/1973 Boris .................... A45D 34/02 239/338

(Continued)

FOREIGN PATENT DOCUMENTS

DE 203 20 413 U1 8/2004
DE 20 2008 011 730 U1 10/2009

(Continued)

OTHER PUBLICATIONS

International Search Report of PCT/EP2014/077181, dated Mar. 27, 2015.

*Primary Examiner* — Paul R Durand
*Assistant Examiner* — Randall Gruby
(74) *Attorney, Agent, or Firm* — Collard & Roe, P.C.

(57) ABSTRACT

The invention relates to a dispenser (1) for dispensing liquid to pasty masses, with a dispenser head (2) that can move under exposure to a spring force for dispensing mass (M), a storage chamber (3) and a pump chamber (4) exhibiting an inlet valve (11) and an outlet valve (12), wherein the dispenser head (2) incorporates a dispenser opening (5) and, in order to seal or release the dispenser opening (5), a closure piston (6) that can be moved in the direction of its longitudinal axis (L), exhibits a distal end allocated to the dispenser opening and a proximal end, and is situated in a mass space (9) of the dispenser head, wherein a section (10) that connects the pump chamber (4) to the mass space (9) further empties into the mass space (9) between the distal and proximal end of the closure piston (6), wherein said connecting section exhibits a central axis (A). In order to favorably design such a dispenser as relates to introducing the dispensing process, it is proposed that the outlet valve (12) of the pump chamber (4) be rigidly coupled with the dispenser head (2), and, when actuated in a first movement (Continued)

segment of the dispenser head that already involves a release of the closure opening (5), a movement into the open position take place, for example the outlet valve (12) enter the pump chamber (4), without otherwise making the pump chamber (4) smaller, at least not significantly.

20 Claims, 6 Drawing Sheets

(56) References Cited

U.S. PATENT DOCUMENTS

| | | | | | |
|---|---|---|---|---|---|
| 5,273,191 | A * | 12/1993 | Meshberg | B05B 11/0018 | 222/105 |
| 5,299,717 | A * | 4/1994 | Geier | B05B 11/3011 | 222/340 |
| 5,429,275 | A * | 7/1995 | Katz | B05B 11/0005 | 222/108 |
| 5,624,055 | A | 4/1997 | Clanet et al. | | |
| 6,685,062 | B1 * | 2/2004 | Ki | B05B 11/3025 | 222/321.7 |
| 6,824,021 | B2 * | 11/2004 | Masuzzo | B05B 11/0072 | 222/321.7 |
| 7,464,839 | B2 * | 12/2008 | Heukamp | B05B 1/3006 | 222/322 |
| 7,780,044 | B2 * | 8/2010 | Leuliet | B05B 11/3004 | 222/321.9 |
| 9,101,951 | B2 | 8/2015 | Goettke | | |
| 9,393,582 | B2 * | 7/2016 | Goettke | B05B 11/3001 | |
| 2004/0129733 | A1 * | 7/2004 | Schultz | B05B 1/3436 | 222/321.7 |
| 2005/0006411 | A1 * | 1/2005 | Kuwahara | B05B 11/3004 | 222/321.1 |
| 2005/0211798 | A1 * | 9/2005 | Garcia | B05B 11/3053 | 239/333 |
| 2005/0214333 | A1 | 9/2005 | Lanzendoerfer et al. | | |
| 2006/0151541 | A1 * | 7/2006 | Pares Montaner | B05B 11/3007 | 222/321.2 |
| 2007/0221686 | A1 * | 9/2007 | Bae | A45D 34/02 | 222/409 |
| 2008/0093389 | A1 * | 4/2008 | Vasseur | B05B 11/0072 | 222/321.9 |
| 2008/0257911 | A1 * | 10/2008 | Choi | A45D 34/04 | 222/320 |
| 2008/0264975 | A1 * | 10/2008 | Bruder | B05B 11/0067 | 222/321.3 |
| 2010/0051649 | A1 * | 3/2010 | Ki | A45D 34/04 | 222/256 |
| 2010/0288856 | A1 * | 11/2010 | Lee | B05B 11/3097 | 239/574 |
| 2011/0121037 | A1 * | 5/2011 | Kakuta | B05B 11/0067 | 222/320 |
| 2012/0018538 | A1 * | 1/2012 | Moretti | B05B 11/0067 | 239/461 |
| 2012/0325862 | A1 * | 12/2012 | Kuwahara | B05B 11/3023 | 222/321.9 |
| 2014/0144945 | A1 * | 5/2014 | Jung | B05B 11/0032 | 222/320 |
| 2014/0231463 | A1 * | 8/2014 | Goettke | B05B 11/3001 | 222/321.7 |
| 2017/0197226 | A1 * | 7/2017 | Espinoza | B05B 11/0089 | |
| 2017/0266679 | A1 * | 9/2017 | Goettke | B05B 11/3025 | |

FOREIGN PATENT DOCUMENTS

| | | | |
|---|---|---|---|
| DE | 10 2011 001 534 | A1 | 9/2012 |
| EP | 0 670 275 | B1 | 7/1999 |
| EP | 2530319 | A1 | 12/2012 |
| JP | S 64-66475 | A | 3/1989 |
| WO | WO 2011093027 | * | 8/2011 |
| WO | 2012/126909 | A1 | 9/2012 |

* cited by examiner

DISPENSER

CROSS REFERENCE TO RELATED APPLICATIONS

This application is the National Stage of PCT/EP2014/077181 filed on Dec. 10, 2014, which claims priority under 35 U.S.C. § 119 of German Application No. 10 2013 113 791.1 filed on Dec. 10, 2013, the disclosure of which is incorporated by reference. The international application under PCT article 21(2) was not published in English.

The invention relates to a dispenser for dispensing liquid to pasty masses, with a dispenser head that can move under exposure to a spring force for dispensing the mass, a storage chamber and a pump chamber exhibiting an inlet valve and an outlet valve, wherein the dispenser head incorporates a dispenser opening and, in order to seal or release the dispenser opening, a closure piston that can be moved in the direction of its longitudinal axis, exhibits a distal end allocated to the dispenser opening and a proximal end, and is situated in a mass space of the dispenser head, wherein a section that connects the pump chamber to the mass space empties into the mass space between the distal and proximal end of the closure piston, wherein said connecting section exhibits a central axis that runs at a right or acute angle relative to the longitudinal axis of the closure piston in a vertical section that is present during conventional usage of the dispenser.

Such dispensers have already become known in a variety of respects. For example, reference is made to DE-U1-20-2008 011 730 and WO-A1-2012/126909.

Known from EP-B1-670275 with respect to a pressurized container is to press down the dispenser head with an actuating lever, wherein a valve that is rigidly coupled with the dispenser head and seals the pressure space is displaced into a release position, and the closure piston is simultaneously shifted into an open position.

Proceeding from the initially indicated prior art, the invention deals with the task of favorably designing a dispenser with a pump chamber and a closure piston for dispensing liquid to pasty mass in terms of initiating the dispensing process.

According to a first inventive idea, one potential solution to the object involves a dispenser in which the objective is for the outlet valve to be rigidly coupled with the dispenser head, and, when actuated in a first movement segment of the dispenser head that already involves a release of the closure opening, shift into an open position, for example enter the pump chamber, without otherwise making the pump chamber smaller.

Because the outlet valve is designed to be rigidly coupled with the dispenser head, its motion is directly coupled to a movement of the dispenser head. As a result, opening the closure opening can be accompanied by the outlet valve of the pump chamber moving into the open position. The opening of the closure opening is accompanied by a corresponding shifting of the closure piston. The merely preferentially provided shifting of the outlet valve into the pump chamber only results in an at most slight mass displacement into the connecting section, and hence the mass space, which can be intercepted by shifting the closure piston, so that mass here does not yet exit through the closure opening.

In this way, the user can move the dispenser into a dispenser standby position, without there simultaneously being a mass exit, or at least any significant mass exit. It is preferred that a return suction effect at the dispenser opening take place in the first movement segment of the dispenser head.

Additional features of the invention are described or illustrated below, also in the description to the figures and drawing, often in their preferred allocation to the concept already explained above; however, they can also be important when allocated to just one or more individual features, which are described or graphically illustrated, or independently or in some other overall concept.

It is preferred that the proximal end of the closure piston, as viewed from the distal end beyond the orifice of the connecting section in the mass space, exhibit a sealing formation that protrudes radially in relation to the longitudinal axis of the closure piston, and that its distal end preferably exhibit a sealing section that is introduced into the closure opening in the sealed state. The sealing formation can favorably border the mass space in an axial direction. The sealing section can be introduced into the closure opening, and additionally provides an effective seal for the dispenser when deactivated and idle.

It is further preferred that the mass space formed between the sealing formation and sealing section, which in any event is filled with mass after the dispenser is first actuated, into which the connecting section then likewise filled with mass empties, exhibits a greater increase in volume in the first movement segment of the dispenser head, in which the addressed displacement of the outlet valve of the pump chamber into the pump chamber has taken place, but the pump chamber has otherwise not yet been compressed, than corresponds to the volume of the mass that simultaneously continues to flow through the connecting section. This greater increase in volume yields a return suction of the mass as allocated to the dispenser opening, i.e., at the distal end of the closure piston, since the otherwise generated vacuum can only be offset by the closure opening. A "suck back" effect comes about, so that the dispenser opening is released before mass is then supplied for dispensing, for example while further pressing down the dispenser head.

It is also preferred that the sealing section be cylindrically shaped relative to the longitudinal axis of the closure piston. The wall of the dispenser opening is preferably also cylindrical in design. In this way, two cylindrical bodies lie one inside the other in the sealed state.

It is also preferred that the sealing section exhibit an expansion section toward the proximal end of the closure piston adjoining a preferably cylindrically designed sealing area, with the formation of a conical surface. The indicated, preferably cylindrically shaped sealing area is correspondingly preferably a portion of the closure piston with a smaller diameter, so that spring loading into the sealed position can here also result in a comparatively high pressing force. As a consequence, any existing residues or encrustations in the dispenser opening can effectively be surmounted by moving the closure piston into the sealed position.

It is also preferred that the conical surface in the sealed state also tightly abut against a correspondingly shaped interior surface of the dispenser head. This favorably enlarges the overall sealing surface. In addition, there correspondingly exists a diversion area from the cylindrical area into the conical surface in relation to the adjoining surfaces in the sealed state. A tightness-enhancing labyrinth effect is present.

It is also preferred that the expansion section be followed by a continuation section formed on the closure piston, the outer surface of which borders part of the mass space during conventional dispenser use in the sealed state. A mass space at least partially adjoins, possibly with the exception of guiding sections that abut against a corresponding guide wall of the mass space, through which the mass is guided in the dispensing process or accommodated during nonuse. The guiding sections or an allocated guide wall are preferably formed in proximity to the distal end of the closure piston. As a result of the above or other measures, a larger increase in volume of the mass space takes place during a movement of the closure piston as viewed from the distal end beyond the orifice of the connecting section into the mass space, in particular a movement in the first movement segment, than in the mass space allocated to the distal end of the closure piston as viewed from said orifice.

In particular, it is preferred that the first movement segment involve a movement, for example, of 1 to 2 mm downward in the vertical direction (given a conventional use of the dispenser) by the dispenser head. For example, a suitable slotted guide of the closure piston of the kind basically known from the WO-A1-2012/126909 mentioned at the outset, which will also be referenced for this purpose, can be used to convert about half of this mentioned path of the dispenser head into a movement of the closure piston in the first movement segment. Correspondingly, the closure piston can here execute a movement of about 0.5 to 1 mm.

It is further preferred that the dispenser head execute a movement of 2 to 4 mm in the second movement segment, but then only a small portion of this movement is then converted into a—further—movement of the closure piston in the direction of its proximal end along the longitudinal axis. For example, the percentage of movement that is then still converted into a movement of the closure piston in the second movement segment can measure 1/25 to 1/10 of the movement of the dispenser head in this second movement segment.

Opposite conditions arise correspondingly during a return movement of the dispenser head from the most depressed position back into the initial position. A third movement segment here initially involves a movement only by the dispenser head, with the outlet valve coupled thereto, which correspondingly is thereby moved into the sealed position without the pump piston being moved or the pump chamber again being enlarged, or at least not substantially. This is correspondingly associated with a movement by the closure piston in the direction of its longitudinal axis and in the direction of the distal end by a portion of the amount (only) traversed by the closure piston in the second movement segment, given the same quantitative partial movement (relative to the second movement segment) by the dispenser head vertically upward. A fourth movement segment of the dispenser head then follows, in which it runs through the vertical dimension of the remaining portion of the second movement segment and the dimension of the first movement segment in the reverse direction from the dispenser head.

The invention also relates to a dispenser that in particular corresponds to the features in the preamble of claim 1, wherein, for example, it is not required, even though preferred, that the connecting section run at an acute angle to a longitudinal axis of the closure piston, wherein it is preferably here provided that the closure piston be situated in a receiving part, and a pump piston comprising part of the pump chamber be arranged so that it can limitedly move relative to the receiving part.

Alternatively or additionally, it can further be provided that a pipe section exhibiting the flow-through opening be plug-connected with the receiving part. The pipe section can preferably also centrally pass through the pump piston. In addition, the pipe section can form a valve plate and/or a flow-through opening. Furthermore, the pipe section can form an engaging projection. It can also be provided that the pipe section be designed as a single piece with the valve plate and/or flow-through openings and/or an engaging projection.

In addition, one or more of the further described features can be realized in this subject matter.

It is also preferred that an outer wall of the closure piston be enveloped by a mass space wall of the dispenser head over the length of the closure piston at a varying radial distance so as to form the mass space. The mass space preferably does not exhibit a uniform radial extension over the entire length. Instead, the latter can vary. It can also differ in relation to a vertical section in terms of an area above the closure piston or in the upper area of the closure piston and an area above the closure piston or in the lower area of the closure piston.

The invention will be explained further below based on the attached drawing, with the latter only serving as an exemplary embodiment of the invention. Shown here on:

Figure 1:
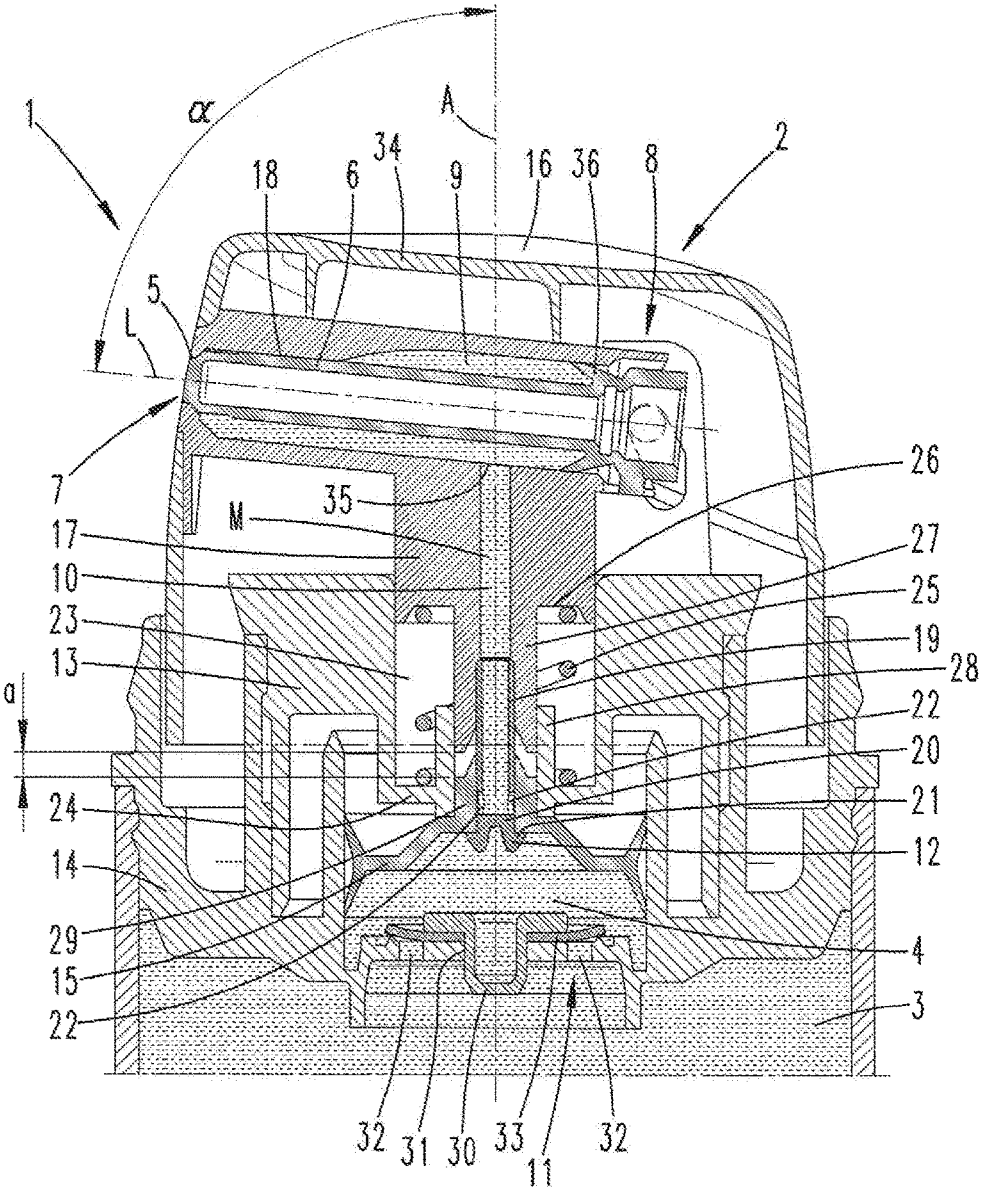
FIG. 1 is a cross section through the dispenser in the upper area, in a non-activated state.

Shown and described is a dispenser 1 depicted only in the upper area.

The dispenser is used to dispense liquid to pasty masses. For example, creams.

The dispenser exhibits a dispenser head 2, a supply chamber 3 and a pump chamber 4.

Formed in the dispenser head 2 is a dispenser opening 5, which can be sealed or released for dispensing purposes by a closure piston 6.

The closure piston 6 exhibits a distal end 7 and a proximal end 8.

The dispenser head 2 also incorporates a mass space 9, in which the mass envelops the closure piston 6 and is kept ready for dispensing. The mass space 9 is connected with the pump chamber 4 via a connecting section 10, which can also be referred to as a connecting line.

The pump chamber 4 is bordered by an inlet valve 11 that separates the pump chamber 4 from the supply chamber 3 on the one hand, and by an outlet valve 12 on the other. The outlet valve 12 is rigidly coupled with the dispenser head 2, so that given a relative movement by the dispenser head 2 toward a fixed part of the dispenser, for example, the guiding part 13, it can be moved into an open position or sealed position.

Figure 2:
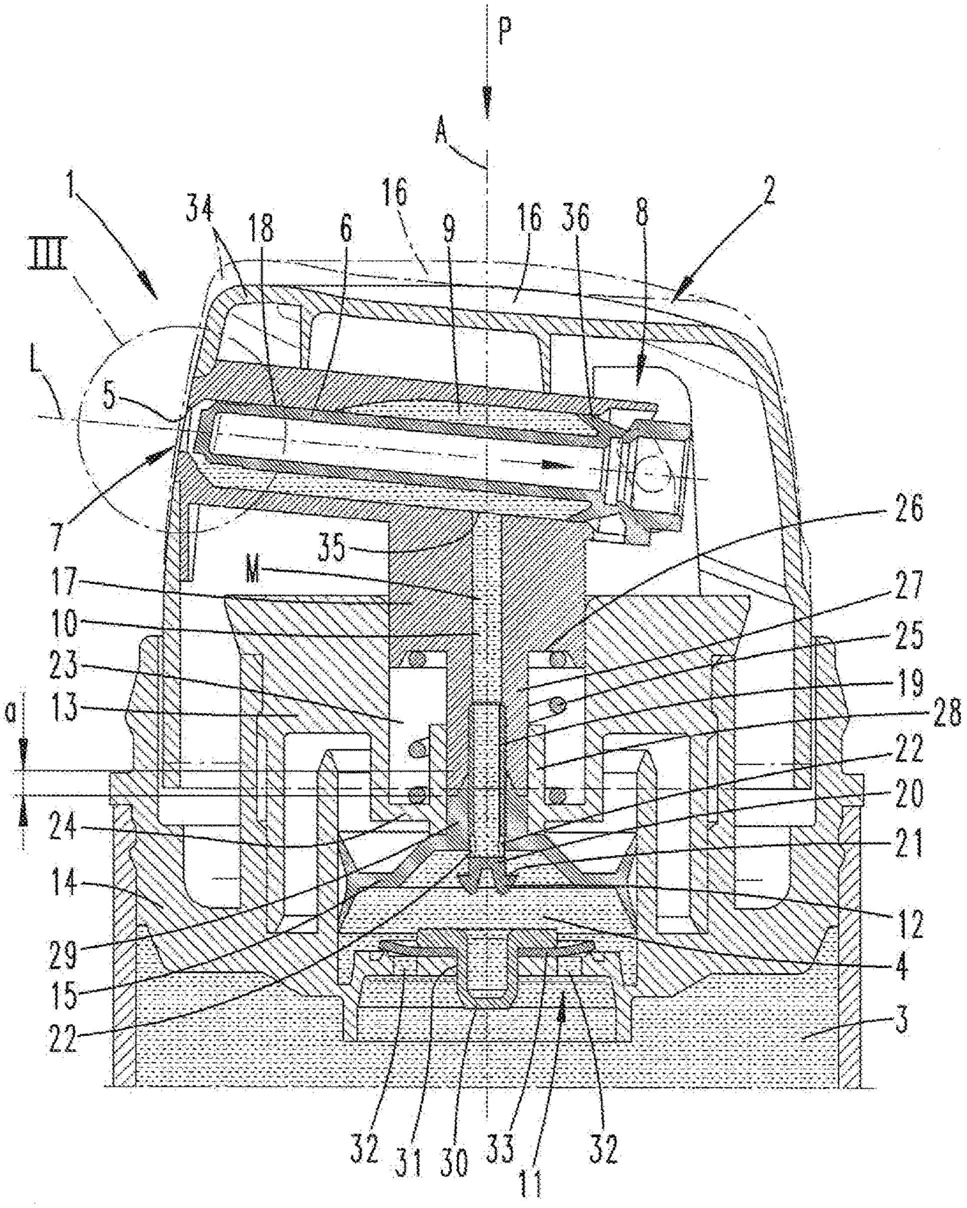
FIG. 2 is a depiction according to FIG. 1 after running through a first movement segment of the dispenser head.

When actuated, the dispenser head 2 initially runs through a first movement segment, which results in a movement by amount a, see FIGS. 1 and 2. This first movement segment is characterized by the fact that, while the outlet valve 12 of the pump chamber 4 is moved into an open position, in which it dips into the pump chamber 4, as evident from a comparison between FIGS. 1 and 2, the pump chamber 4 is otherwise not yet made smaller. The dispenser head 2 likewise runs through an idle stroke, in which only the outlet valve and closure piston are acted upon.

In the exemplary embodiment, the pump chamber 4 is bordered by a preferably fixed floor part 14 on the one hand, and by a pump piston 15 that can be moved by the dispenser head 2 on the other. The pump piston 15 is guided along a fixed pump chamber wall in a known manner by means of vertically spaced apart sealing lips.

Figure 4:
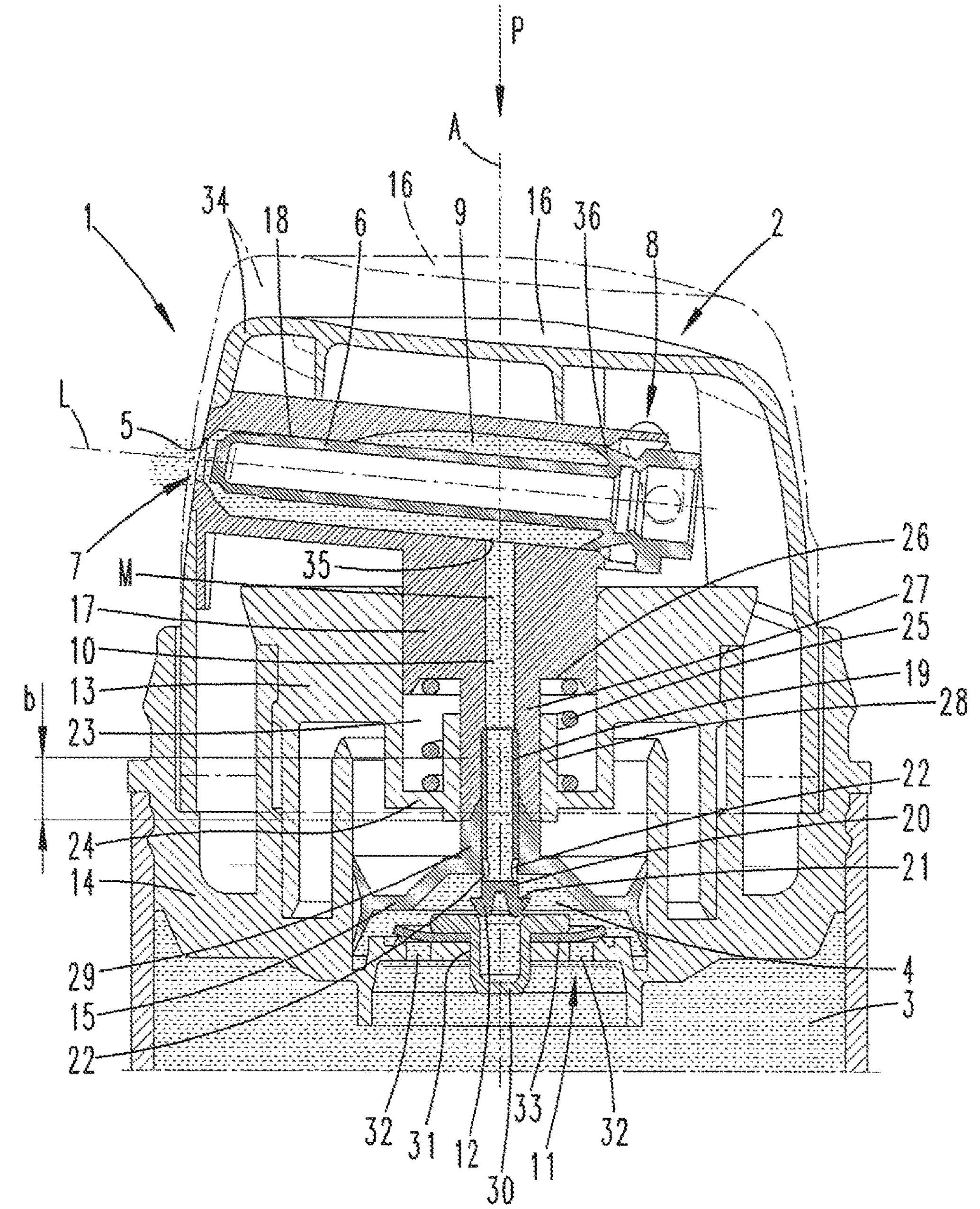
FIG. 4 is a depiction of the dispenser according to FIG. 1 after traversing a second movement segment of the dispenser head while pressing the latter down.

In a second movement segment arising from a comparison between FIGS. 2 and 4, the dispenser head 2 is moved by amount b subsequent to the amount a, see FIG. 4, and the pump piston 15 is moved further vertically downward—relative to a conventional setup of the dispenser in a dispensing process—with the outlet valve 12 still open, so that the pump chamber 4 is made smaller, and mass M is dispensed from the dispenser opening 5, e.g., see FIG. 4. The user can also feel a transition from the first to the second movement segment. Compressing the pump chamber is associated with a tangibly higher resistance.

Another detail comprising the dispenser head 2 involves a cap 34, the upper side of which has molded into it an actuating trough 16, for example to be touched by a finger of an actuating hand.

A receiving part 17 is immovably situated inside the dispenser head so that it can correspondingly move with the latter, and incorporates the closure piston 6 with the formation of the mass space 9. The preferably one-piece receiving part 17 also incorporates the connecting section 10.

The receiving part 17 exhibits guiding sections for the closure piston 6, of which one guiding section 18 is visible in the illustration.

The pump chamber side of the receiving part 17 further incorporates the outlet valve 12 of the pump chamber 4 or is connected thereto, preferably retained with a plug.

Figure 5:
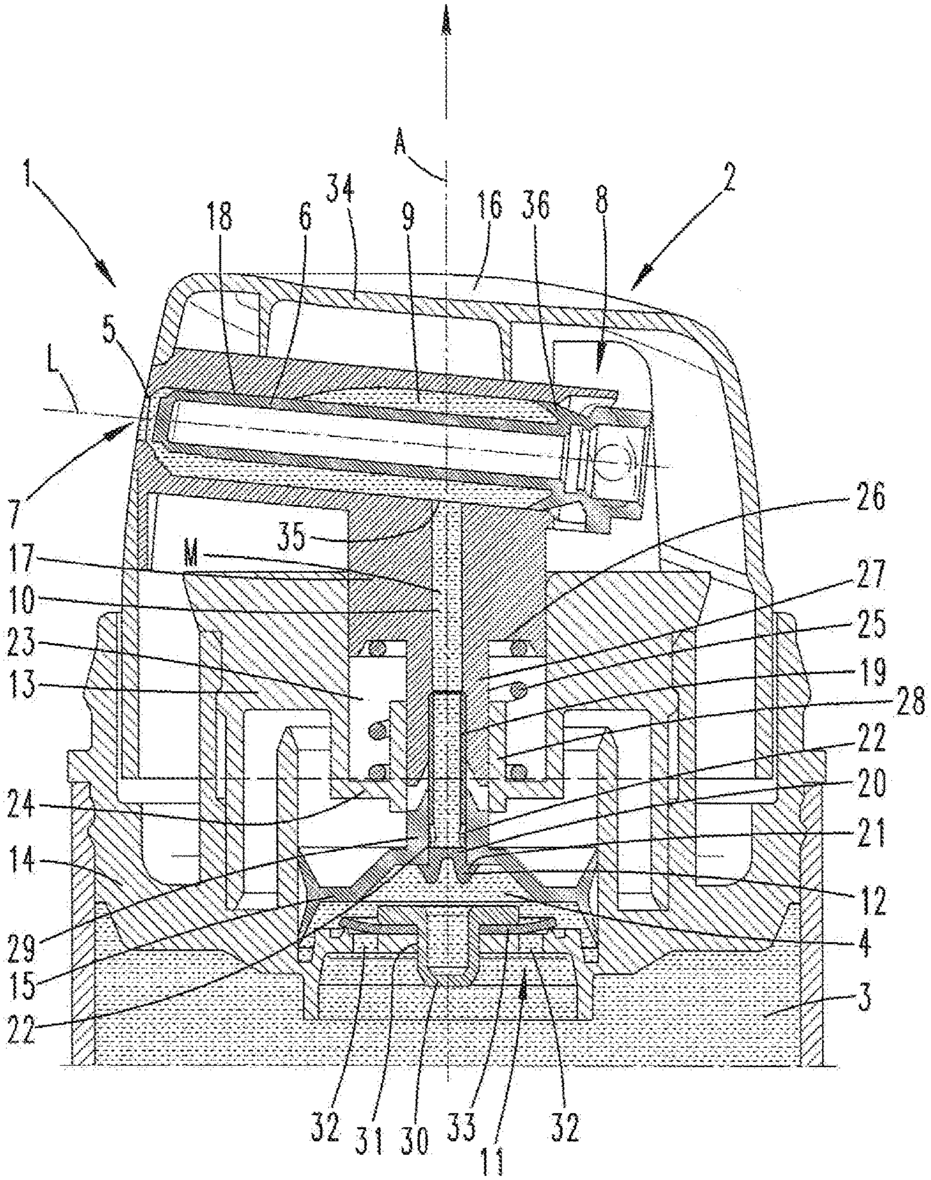
FIG. 5 is a depiction according to FIG. 1 or FIG. 4 after initiating a return movement of the dispenser head and traversing a third movement segment.

In a third movement segment, see FIGS. 4 and 5, the dispenser head 2 again travels upward until the outlet valve closes. The dimension for the movement here obviously corresponds to dimension a.

In a further detail, the outlet valve 12 exhibits a tubular plug-in section 19, which is also referred to as a pipe section further on, wherein the plug-in function is not key, but can be provided, which is bordered on the pump chamber side by a closure plate 20 that produces the valve effect. It is further preferred that the closure plate 20 be provided with engaging projections 21 on the pump chamber side. The engaging projections 21 make it possible to drag the pump chamber 15 from the position on FIG. 5 into the position on FIG. 6 in a fourth movement segment, which has just been traversed in the illustration on FIG. 6.

It is further preferred that the outlet valve 12 exhibit one or more flow-through openings 22 on the top side of the closure plate 20, through which mass M can be conveyed from the pump chamber 4 into the connecting section 10, from there into the mass chamber 9, and finally to the dispenser for dispensing purposes, all with the outlet valve 12 in the open state and the pump chamber 4 being made smaller.

The flow-through openings 22 are preferably also formed in the plug-in section 19, which is further preferably tubular. When actuating the dispenser head 2 according to the first movement segment, see also FIG. 2, they move into the protruding position, so that, starting in this position of the outlet valve 12, mass M can flow out of the pump chamber 4 into the connecting section 10 in the manner described while continuing to press down on the dispenser head 2.

The receiving part 17 is guided into the already addressed guiding part 13, which is fixed on the housing in the assembled state. To this end, the guiding part 13 exhibits a guide opening 23 that is preferably central, and further preferably cylindrical, into which the receiving part 17 with a plug-in section tailored thereto is inserted to varying depths, depending on the actuating state and movement segment traversed.

The receiving part 17 is further supported against a floor area 24 of the guiding part 13 by means of a return spring 25. As the mentioned movement segments of the dispenser head 2 are being traversed, the return spring 25 is compressed, and ensures that the dispenser head 2 is returned to the initial position according to FIG. 1.

In preferably its area introduced into the guiding part 13, the receiving part 17 forms a larger-diameter counter-bearing area 26 for the return spring 25 on the one hand, and on the other hand further preferably forms a smaller-diameter, but further preferably overall cylindrical insertion section 27, which is accommodated in a guiding section 28 of the guiding part 13, and can vertically move therein.

The guiding section 28 further incorporates a guiding projection 29 of the pump piston 15, which can also vertically move therein. The guiding projection 29 is also guided along the plug-in section 19.

After the first movement segment has been traversed, as depicted on FIG. 2, an end face of the insertion section 27 comes to abut against a corresponding surface of the guiding projection 29 of the pump piston 15, and thereby presses the pump piston 15 vertically downward while traversing the second movement segment, thereby correspondingly diminishing the volume of the pump chamber 4. Dimension a thus preferably corresponds to a distance, with the dispenser in a non-activated state, between the insertion section 27 (lower end face) and allocated surface of the pump piston, here especially of the guiding projection 29.

The end face of the insertion section 27 and/or the corresponding surface of the guiding projection 29 of the pump piston 15 preferably has a V-shaped cross section, which expands radially outward relative to a central axis A of the connecting section 10.

In the exemplary embodiment, the inlet valve 11 of the pump chamber 4 takes the form of a check valve. Provided specifically is a plug part 30, which is inserted into a plug-in opening 31 of the floor area of the floor part 14. One or more flow-through openings 32 are provided around the latter, which are covered by a membrane part 33 enclosed between the floor area of the floor part 14 and the plug part 30.

Figure 6:
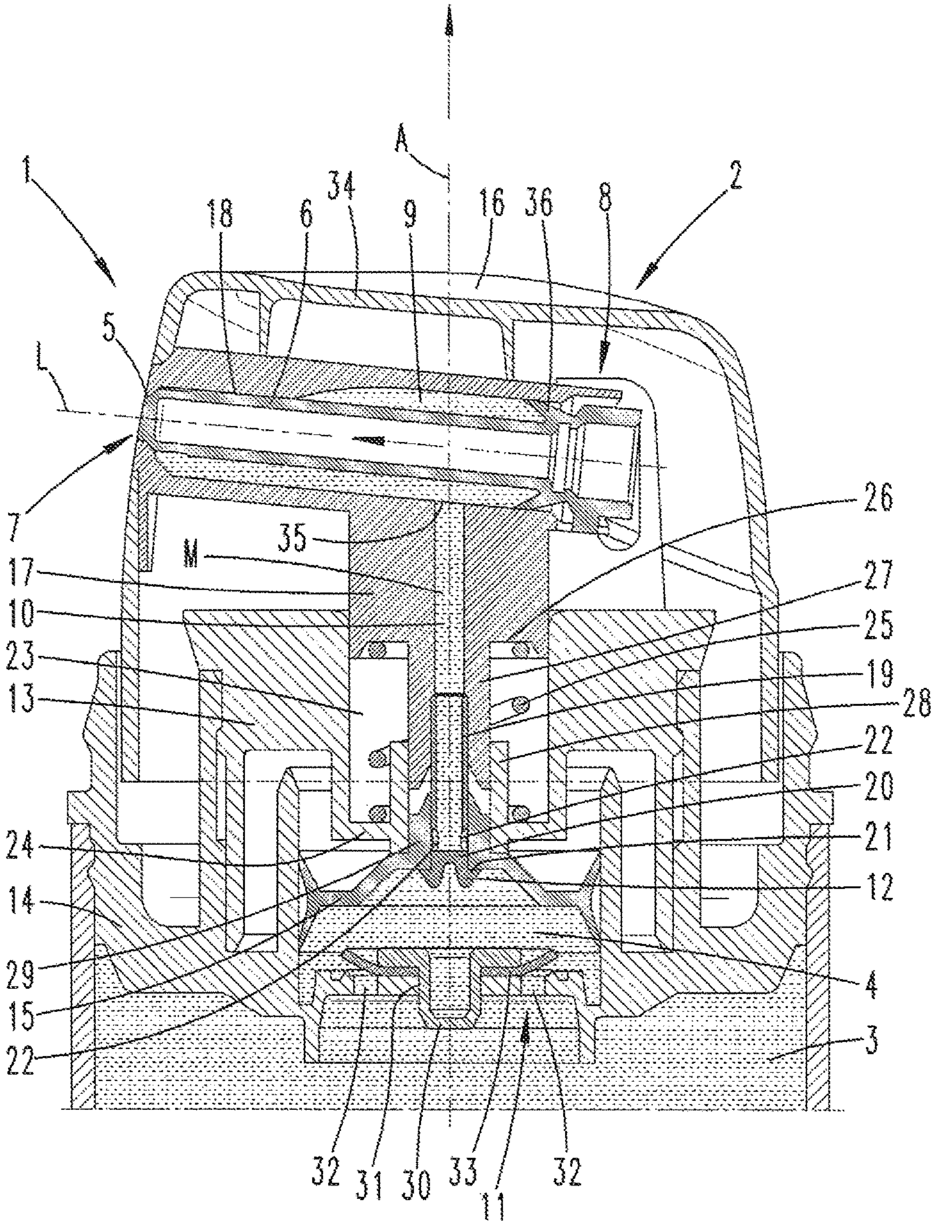
FIG. 6 is a depiction according to FIG. 1 at the end of the return movement, with the inlet valve still open.

During a rearward movement of the pump piston 15 in the initial position, i.e., from approximately the position on FIG. 5 into the position on FIG. 6, the mass M is siphoned out of the supply chamber 3 through the inlet valve 11, during which the membrane 33 is lifted from the flow-through openings 32. FIG. 6 illustrates the state of the dispenser at the end of this rearward movement. The inlet valve 11 is still depicted in the opening state only for the sake of clarity.

The guiding projection 29 of the pump piston 15 is obviously guided radially outward on the inner surface of a guide wall of the guiding part 13 on the one hand, and on the other hand on the inside along an outer surface of the plug-in section 19. It may also be enough for guiding to take place on one of these parts.

Figure 3:
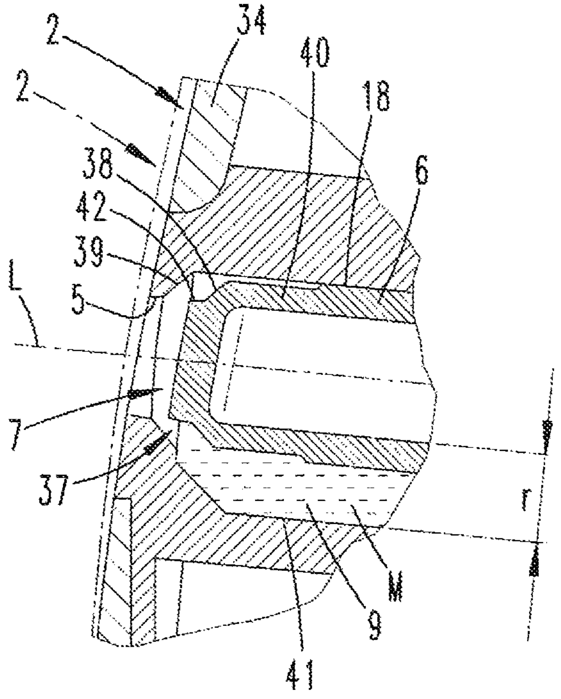
FIG. 3 is a magnified view from FIG. 2 in the area of the dispenser opening.

Visible with regard to FIG. 3 in a further detail is the geometric shape of the closure piston 6 in its distal end area.

The foremost part, the sealing section 37, preferably exhibits a cylindrical sealing area 42. This is followed by a conical surface 38, with which the sealing stopper expands conically, proceeding from the sealing area 42. The conical surface 38 is followed by a continuation section 40. The continuation section 40 is provided so as to run over its periphery at a varying radial distance from the mass space wall 41 in both the open and sealed state. As evident, a very small distance is present in the upper area (as relates to a conventional use position), while a larger distance is present in the lower area.

The conical surface 38 abuts against an allocated dispenser head surface 39 in the sealed state.

As may further be gleaned from FIG. 4, for example, the connecting section 10 empties into the mass space 9 at the orifice 35. The proximal end of the closure piston 6 exhibits a radially protruding sealing formation 36, which tightly interacts with the surrounding mass space wall 41.

A central axis A of the connecting section 10 includes an acute angle α with a longitudinal axis L of the closure piston (see FIG. 1). For example, angle α can measure 10° to 85°, wherein all mean values are also included in the disclosure, in particular in whole degrees.

The above statements serve to explain all of the inventions encompassed by the application, which independently further develop prior art via the following feature combinations, specifically:

A dispenser, characterized in that the outlet valve 12 of the pump chamber 4 is rigidly coupled with the dispenser head 2, and that, during an actuation in a first movement segment of the dispenser head 2, in which the sealing opening 5 is already released, a movement into the open position takes place, for example, the outlet valve 12 travels into the pump chamber 4, without otherwise making the pump chamber smaller 4, at least not significantly.

A dispenser, characterized in that the proximal end of the closure piston 6 as viewed from the distal end beyond the orifice 35 of the connecting section 10 exhibits a sealing formation 36 that protrudes radially in relation to the longitudinal axis L of the closure piston 6, while its distal end exhibits a sealing section 37 that is inserted into the dispenser opening 5 in the sealed state.

A dispenser, characterized in that the mass space 9 formed between the sealing formation 36 and sealing section 37, which in any event is filled with the mass M following an initial actuation of the dispenser 1, into which the connecting section 10 then likewise filled with the mass M empties, exhibits a larger increase in volume in the first movement segment of the dispenser head 2 than corresponds to the volume of the mass M simultaneously flowing through the connecting section 10.

A dispenser, characterized in that the sealing section 47 exhibits a sealing area 42 that is cylindrical in shape relative to the longitudinal axis L of the closure piston 6.

A dispenser, characterized in that the sealing section 37 exhibits an expansion section toward the proximal end of the closure piston 6 adjoining the sealing area 42, resulting in the formation of a conical surface 38.

A dispenser, characterized in that the conical surface 38 likewise tightly abuts against a correspondingly shaped dispenser head surface 39.

A dispenser, characterized in that a continuation section is formed after the expansion section on the closure piston 6, and its outer surface borders a portion of the mass space 9 during conventional dispenser use in the sealed state.

A dispenser, characterized in that, in order to create the mass space 9, an outer surface of the closure piston 6 is enveloped by a mass space wall 41 of the dispenser head over the length of the closure piston 6 at a varying radial distance.

A dispenser, characterized in that, in order to create the mass space 9, an outer surface of the closure piston 6 is enveloped by a mass space wall 41 of the dispenser head over the periphery of the closure piston 6 at a varying radial distance.

A dispenser, characterized in that the pump piston 15 is arranged so that it can limitedly move relative to the receiving part 17.

A dispenser, characterized in that the connection is established by means of a pipe section.

A dispenser, characterized in that the pipe section exhibiting a flow-through opening is plug-connected with the receiving part 17.

A dispenser, characterized in that the pipe section passes through the pump piston.

A dispenser, characterized in that the pipe section centrally passes through the pump piston.

A dispenser, characterized in that the pipe section forms a valve plate.

A dispenser, characterized in that the pipe section forms flow-through openings.

A dispenser, characterized in that the pipe section forms an engaging projection 21.

A dispenser, characterized in that the pipe section is designed as a single piece with the valve plate.

A dispenser according to one of the preceding claims, characterized in that the pipe section is designed as a single piece with the flow-through openings.

A dispenser, characterized in that the pipe section is designed as a single piece with an engaging projection 21.

A dispenser, characterized in that the sealing part is designed as a closure piston 6.

| Reference List | |
|---|---|
| 1 | Dispenser |
| 2 | Dispenser head |
| 3 | Supply chamber |
| 4 | Pump chamber |
| 5 | Dispenser opening |
| 6 | Closure piston |
| 7 | Distal end |
| 8 | Proximal end |
| 9 | Mass space |
| 10 | Connecting section |
| 11 | Inlet valve |
| 12 | Outlet valve |
| 13 | Guiding part |
| 14 | Floor part |
| 15 | Pump piston |
| 16 | Actuating trough |
| 17 | Receiving part |
| 18 | Guiding section |
| 19 | Plug-in section |
| 20 | Sealing plate |
| 21 | Engaging projection |
| 22 | Flow-through opening |
| 23 | Guide opening |
| 24 | Floor area |
| 25 | Return spring |
| 26 | Counter-bearing area |
| 27 | Insertion section |
| 28 | Guiding section |
| 29 | Guiding projection |
| 30 | Stopper part |
| 31 | Plug-in opening |
| 32 | Flow-through opening |
| 33 | Membrane part |
| 34 | Cap |
| 35 | Orifice |
| 36 | Sealing formation |
| 37 | Sealing section |
| 38 | Conical surface |
| 39 | Dispenser head surface |
| 40 | Continuation section |

-continued

| Reference List | |
|---|---|
| 41 | Mass space wall |
| 42 | Sealing section |
| a | Amount |
| b | Amount |
| α | Angle |
| A | Central axis |
| L | Longitudinal axis |
| M | Mass |

The invention claimed is:

1. A dispenser for dispensing liquid to pasty masses, with a dispenser head that can move under exposure to a spring force for dispensing mass, a storage chamber and a pump chamber exhibiting an inlet valve and an outlet valve, wherein the dispenser head incorporates a dispenser opening, wherein in order to seal and release the dispenser opening, a closure piston, that can be moved in a direction parallel to its longitudinal axis and that exhibits a distal end allocated to the dispenser opening and a proximal end, is situated in a mass space of the dispenser head, wherein a receiving part has a connecting section that connects the pump chamber to the mass space further empties into the mass space between the distal and proximal end of the closure piston, wherein said connecting section exhibits a central axis that runs at a right or acute angle relative to the longitudinal axis of the closure piston in a vertical section that is present during conventional usage of the dispenser, wherein the outlet valve of the pump chamber is rigidly coupled with the dispenser head, wherein a first movement of the dispenser head involves a release of the closure piston from the dispenser opening and moves the outlet valve into an open position, wherein the pump piston is connected with the receiving part having the mass space that accommodates the closure piston therein, wherein the connection between the pump piston and the receiving part is established by a pipe section, the pipe section being directly connected to the receiving part and directly connected to the pump piston, and wherein the pump piston is arranged so that it can limitedly move relative to the receiving part.

2. The dispenser according to claim 1, wherein the connecting section comprises an orifice, wherein the proximal end of the closure piston, as viewed from the distal end beyond the orifice of the connecting section, exhibits a sealing formation that protrudes radially in relation to the longitudinal axis of the closure piston, and wherein its distal end exhibits a sealing section that is introduced into the dispenser opening in the sealed state.

3. The dispenser according to claim 2, wherein the sealing section exhibits a sealing area that is cylindrically shaped relative to the longitudinal axis of the closure piston.

4. The dispenser according to claim 3, wherein the sealing section comprises a conical surface toward the proximal end of the closure piston adjoining the sealing area.

5. The dispenser according to claim 4, wherein the conical surface in the sealed state also tightly abuts against a correspondingly shaped dispenser head surface.

6. The dispenser according to claim 4, wherein the conical surface is followed by a continuation section formed on the closure piston, the outer surface of which borders part of the mass space during conventional dispenser use in the sealed state.

7. The dispenser according to claim 1, wherein the mass space is formed between the sealing formation and sealing section, which is filled with mass after the dispenser is first actuated, into which the connecting section then likewise filled with massy empties, and wherein the mass space exhibits a greater increase in volume in the first movement of the dispenser head than corresponds to the volume of the mass that simultaneously continues to flow through the connecting section.

8. The dispenser according to claim 1, wherein the closure piston has a length, and wherein an outer surface of the closure piston is enveloped by a mass space wall of the dispenser head over the length of the closure piston at a varying radial distance so as to form the mass space.

9. The dispenser according to claim 1, wherein an outer surface of the closure piston is enveloped by a mass space wall of the dispenser head over the periphery of the closure piston at a varying radial distance so as to form the mass space.

10. The dispenser according to claim 1, wherein the first movement of the dispenser head moves flow-through openings of the outlet valve into the pump chamber.

11. A dispenser for dispensing liquid to pasty masses, with a dispenser head that can move under exposure to a spring force for dispensing mass, a pump piston, a storage chamber and a pump chamber, wherein the dispenser head incorporates a dispenser opening, and the pump piston is connected with a receiving part that accommodates a sealing part, wherein the connection between the pump piston and the receiving part having a mass space that accommodates the sealing part therein is established by a pipe section, the pipe section being directly connected to the receiving part and directly connected to the pump piston, wherein the pump piston is arranged so that it can limitedly move relative to the receiving part, and wherein the sealing part is a closure piston.

12. The dispenser according to claim 11, wherein the pipe section comprises a flow-through opening and forms a plug received within the receiving part.

13. The dispenser according to claim 11, wherein the pipe section passes through the pump piston.

14. The dispenser according to claim 13, wherein the pipe section passes through a central portion of the pump piston.

15. The dispenser according to claim 11, wherein the pipe section comprises a valve plate.

16. The dispenser according to claim 15, wherein the pipe section is designed as a single piece with the valve plate.

17. The dispenser according to claim 11, wherein the pipe section comprises flow-through openings.

18. The dispenser according to claim 17, wherein the pipe section is designed as a single piece with the flow-through openings.

19. The dispenser according to claim 11, wherein the pipe section forms an engaging projection.

20. The dispenser according to claim 19, wherein the pipe section is designed as a single piece with the engaging projection.

* * * * *